United States Patent
Kim et al.

(10) Patent No.: US 9,586,467 B2
(45) Date of Patent: Mar. 7, 2017

(54) CORELESS ENGINE MOUNT AND METHOD OF MANUFACTURING THE SAME

(71) Applicant: Hyundai Motor Company, Seoul (KR)

(72) Inventors: Seungwon Kim, Seoul (KR); Yongjin Kim, Gwangmyeong-si (KR); Yongjoo Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 371 days.

(21) Appl. No.: 14/079,504

(22) Filed: Nov. 13, 2013

(65) Prior Publication Data

US 2015/0028182 A1   Jan. 29, 2015

(30) Foreign Application Priority Data

Jul. 23, 2013   (KR) .................... 10-2013-0086859

(51) Int. Cl.
*F16M 13/00* (2006.01)
*B60K 5/12* (2006.01)
*F16F 1/38* (2006.01)

(52) U.S. Cl.
CPC .............. *B60K 5/12* (2013.01); *F16F 1/3849* (2013.01); *Y10T 29/49622* (2015.01)

(58) Field of Classification Search
CPC ....... B60K 5/12; B62D 21/155; F16F 1/3849; Y10T 29/49622
USPC ........ 248/562, 635, 674, 675; 180/292, 297, 180/788
See application file for complete search history.

(56) References Cited

U.S. PATENT DOCUMENTS 6,460,822 B1 * 10/2002 Lee ...................... B60K 5/1208
  248/635
6,592,285 B1 * 7/2003 Schwarz ................. F16F 15/08
  248/632

FOREIGN PATENT DOCUMENTS

| JP | 2006-177544 A | | 7/2006 |
|---|---|---|---|
| JP | 2009-36295 A | | 2/2009 |
| JP | 2009-196512 A | | 9/2009 |
| JP | 2009196512 A | * | 9/2009 |
| KR | 1999-0025224 U | | 7/1999 |
| KR | 10-2005-0008380 A | | 1/2005 |
| KR | 10-2005-0023736 A | | 3/2005 |
| KR | 10-2007-0097644 A | | 10/2007 |
| KR | 10-2008-0043661 A | | 5/2008 |
| KR | 10-2009-0103102 A | | 10/2009 |

* cited by examiner

*Primary Examiner* — Gwendolyn Baxter
(74) *Attorney, Agent, or Firm* — Morgan, Lewis & Bockius LLP

(57) ABSTRACT

A coreless engine mount, and a method for manufacturing a coreless engine mount, may include a mount bracket that has at least one bolting hole for bolting and houses a mounting bush, and combines with the mounting bush, and a coreless support bracket that has an extension integrally extending from the mounting bush and is formed of an aluminum material, the extension being integrally formed with the mounting bush by curing, and the extension having at least one bolting hole for bolting.

7 Claims, 12 Drawing Sheets

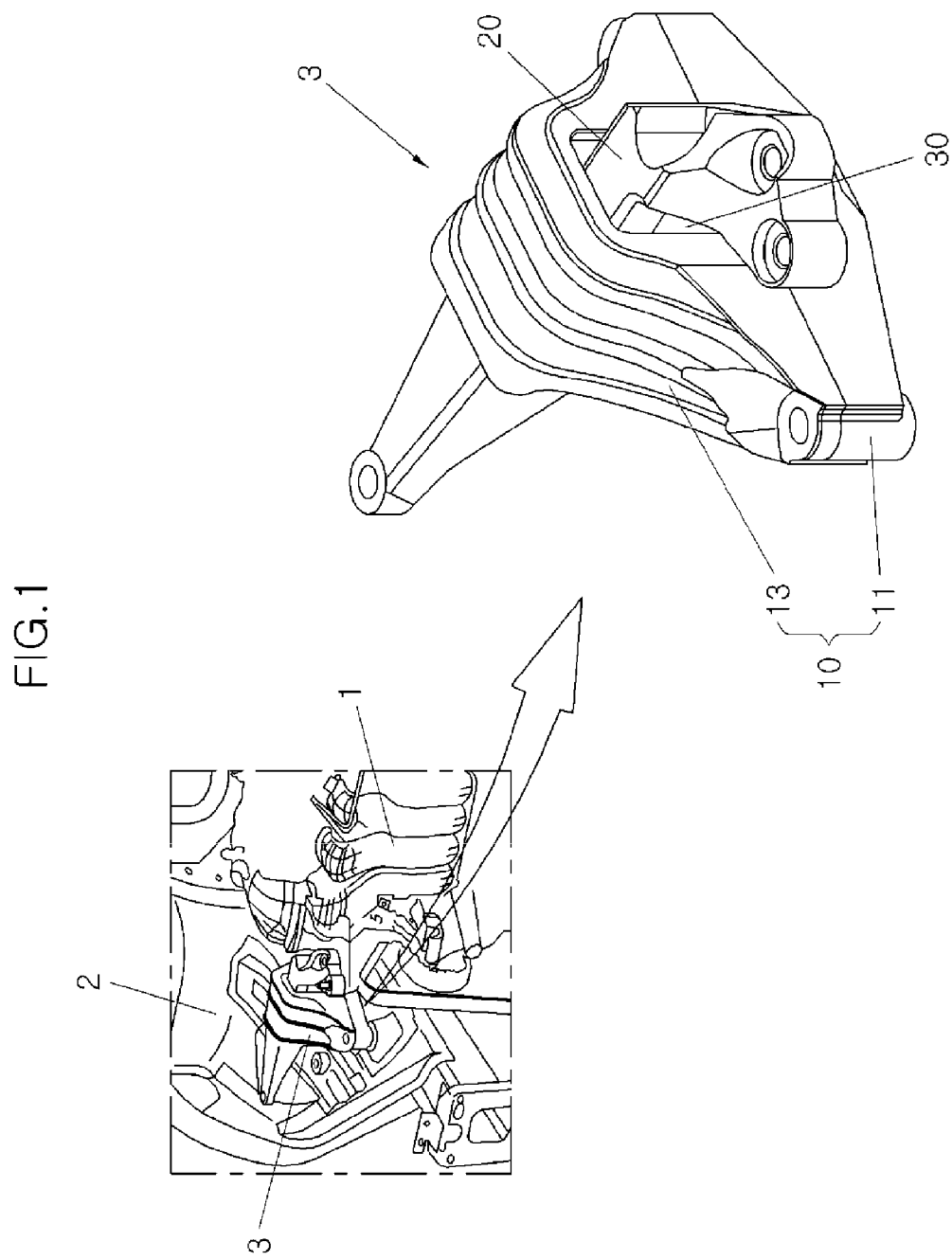

FIG.9
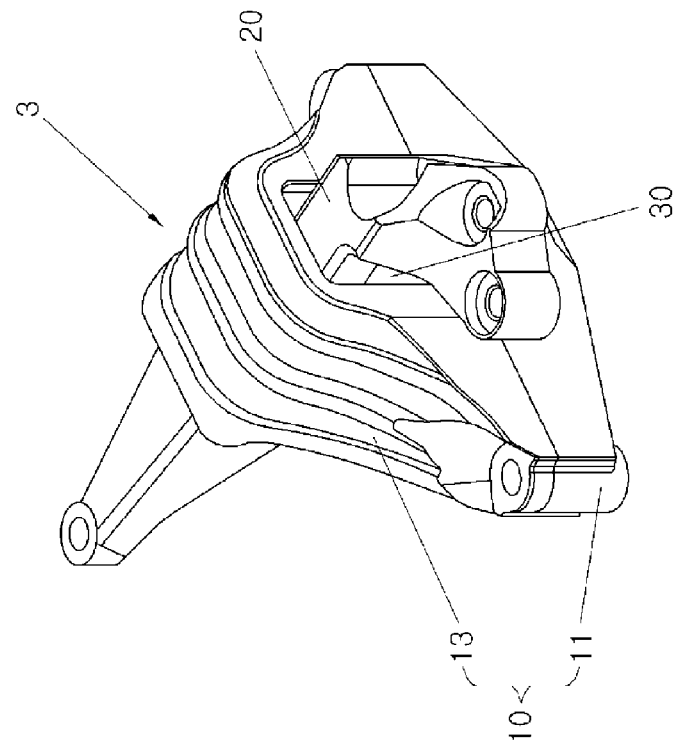
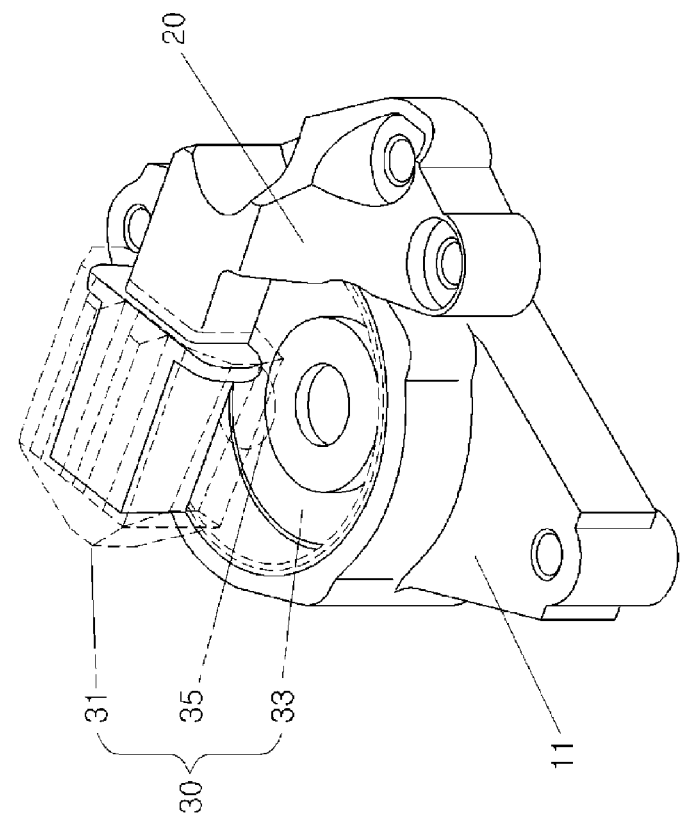

CORELESS ENGINE MOUNT AND METHOD OF MANUFACTURING THE SAME

CROSS-REFERENCE(S) TO RELATED APPLICATIONS

The present application claims priority of Korean Patent Application Number 10-2013-0086859 filed on Jul. 23, 2013, the entire contents of which application are incorporated herein for all purposes by this reference.

BACKGROUND OF INVENTION

Field of Invention

The present invention relate to an engine mount and, particularly, to a coreless engine mount and a method of manufacturing the same, in which a mounting bush is integrally cured to a support bracket, thereby reducing manufacturing processes associated with the use of a core and satisfying required durability.

Description of Related Art

In general, an engine mount includes a mount bracket fixed to a body frame, a support bracket fixed to a rigid body such as an engine-side cylinder block (or chain cover), and a mounting bush and a core coupling the mount bracket and the support bracket. Typically, the mount bracket has the mounting bush, and the support bracket has the core. The mounting bush and the core are fastened by bolts.

However, it is very important for the engine mount to serve to stably mount an engine on the body frame and to absorb and damp continuous vibration and noise caused by operation of the engine so as to prevent them from being transferred to a body. Therefore, components of the engine mount are designed so as not to exert an influence on a natural frequency of the engine mount.

An example of such design is a method of avoiding an influence of the natural frequency resulting from weight of the core and improving noise, vibration, and harshness (NVH). In this method, steel is replaced with aluminum so that the weight of the core itself is reduced.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

An engine mount should be designed to secure safety in which it is not separated from the engine or the body frame in the event of collision prior to the performance of vibration. For example, in the engine mount to which a cantilever beam type support bracket is applied and in which a core formed of aluminum is located at an end of a support bracket, the influence of the natural frequency caused by the core is reduced, and a fastening force of the mount bracket and the support bracket is reduced due to intervention of the core. As a result, in the event of collision, a characteristic function of the engine mount may be weakened, and what is worse, there is a chance of separation of the mount bracket and the support bracket.

Various aspects of the present invention are directed to a coreless engine mount in which a support bracket is made of an aluminum material or similar materials, so that weight of the engine mount is reduced and thus the influence of a natural frequency caused by the weight is greatly reduced, and in which a mounting bush is directly cured to the support bracket so that a work process such as a bolting process is removed and the durability of the engine mount which is required in the event of collision is satisfied, and a method of manufacturing the same.

In accordance with various aspects of the present invention, a coreless engine mount includes: a mount bracket that has at least one bolting hole for bolting and houses a mounting bush, and combines with the mounting bush; and a coreless support bracket that has an extension integrally extending from the mounting bush and is formed of an aluminum material, the extension being integrally formed with the mounting bush by curing, and the extension having at least one bolting hole for bolting.

The mount bracket may include a sub-bracket and a main bracket, and the sub-bracket and the main bracket may overlap to form a housing space for housing the mounting bush. The coreless support bracket may further include a portion that is not surrounded by the mounting bush within the extension integrally formed with the mounting bush, and the extension may be bent at an end of the portion that is not surrounded by the mounting bush.

The extension integrally formed with the mounting bush may be divided by a stopper flange into a portion that is surrounded by the mounting bush and the portion that is not surrounded by the mounting bush, and the stopper flange may be surrounded by the mounting bush. The stopper flange may have a larger cross section than the portion surrounded by the mounting bush and the portion that is not surrounded by the mounting bush.

The extension integrally formed with the mounting bush may further include a reinforcement boss, and the reinforcement boss may protrude in substantially reverse triangular cross section. The mounting bush may include a core body integrally surrounding the coreless support bracket, and an insulator formed at an end of a reinforcement body integrally extending from the core body.

In accordance with various other aspects of the present invention, a method of manufacturing a coreless engine mount includes: preparing a mount bracket, a coreless support bracket formed of an aluminum material, and a curing mold of a mounting bush formed of an elastic material and connecting the mount bracket and the coreless support bracket, and placing a partial section of the coreless support bracket in a cavity of the curing mold; curing and surrounding the partial section of the coreless support bracket to form a unity mounting-bush coreless-support-bracket; and disposing the mounting bush of the unity mounting-bush coreless-support-bracket in a housing space of the mount bracket, and connecting the mount bracket and the coreless support bracket with the mounting bush.

The unity mounting-bush coreless-support-bracket may include a stopper flange surrounded by the mounting bush, and the stopper flange may have a larger cross section than a portion surrounded by the mounting bush. The unity mounting-bush coreless-support-bracket may further include a reinforcement boss surrounded by the mounting bush, and the reinforcement boss protrudes in a reverse triangular cross section.

The support bracket constituting the engine mount is formed of an aluminum material, and the mounting bush is directly cured to the support bracket so as to avoid using bolts. Thereby, in comparison with use of a core and bolts, weight is reduced by about 30%. Further, the weight of the engine mount is greatly reduced. Thereby, noise, vibration, and harshness (NVH) based on an increase in natural frequency is improved by about 171%, compared to conventional weight.

Further, the mounting bush is directly cured to the support bracket constituting the engine mount. Thereby, a work process associated with bolting work is removed, and productivity caused by process reduction is greatly improved. In addition, the engine mount is coupled with the mount bracket using the combination mounting-bush support-bracket. Thereby, the durability required for the engine mount is satisfied. Particularly, separation of the support bracket and the mount bracket in the event of collision is prevented.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 shows a configuration of an exemplary coreless engine mount according to the present invention.

FIG. 9 shows an exemplary coreless engine mount assembled by the method of FIG. 4.

DETAILED DESCRIPTION

Figure 2A:
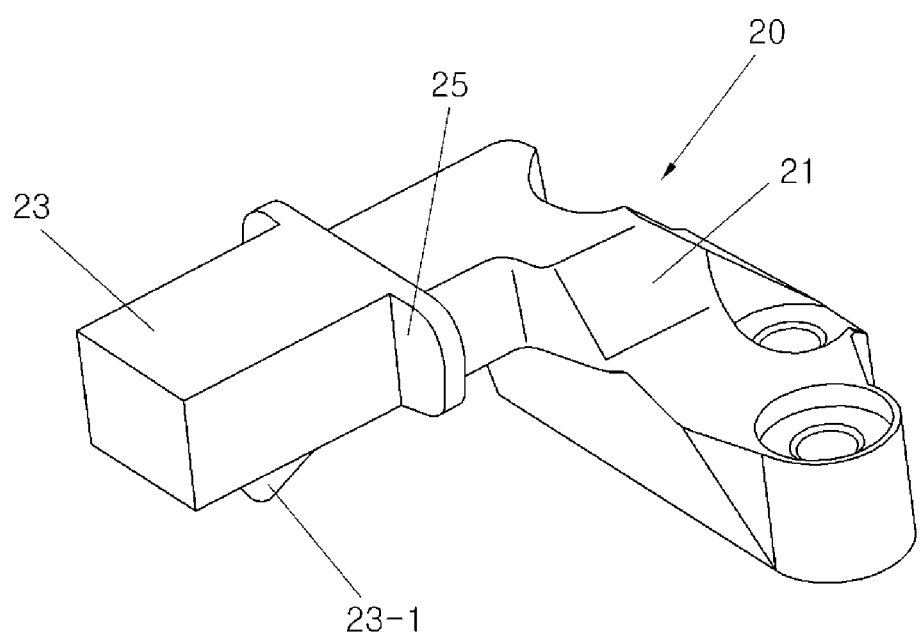
FIG. 2A and FIG. 2B show configurations of an exemplary coreless support bracket and an exemplary mounting bush constituting an exemplary coreless engine mount according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims. Throughout the disclosure, like reference numerals refer to like parts throughout the various figures and embodiments of the present invention.

FIG. 1 shows a configuration of a coreless engine mount according to various embodiments of the present invention. As shown, an engine mount 3 includes a mount bracket 10 fastened to a body panel 2, a coreless support bracket 20 fastened to an engine 1, and a mounting bush 30 producing a fixing force of the mount bracket 10 and the coreless support bracket 20.

The mount bracket 10 includes a sub-bracket 11 and a main bracket 13 that are coupled in an overlapping state. The sub-bracket 11 and the main bracket 13 are provided with mounting bush spaces into which the mounting bush 30 is inserted and fixed in close contact, and a plurality of bolting holes through which they are fastened to the body panel 2 by bolts. Typically, the mount bracket 10 is a box type.

The coreless support bracket 20 is formed of an aluminum material or similar materials and is configured so that one side thereof is fastened to the engine 1, and the other side thereof is coupled with the mount bracket 10. The mounting bush 30 is formed of an elastic material and is coupled with the mount bracket 10 while surrounding the coreless support bracket 20. Thereby, a fixing force is produced between the mount bracket 10 and the coreless support bracket 20. Thus, the engine mount 3 according to the present invention is called a coreless engine mount 3.

Figure 2B:
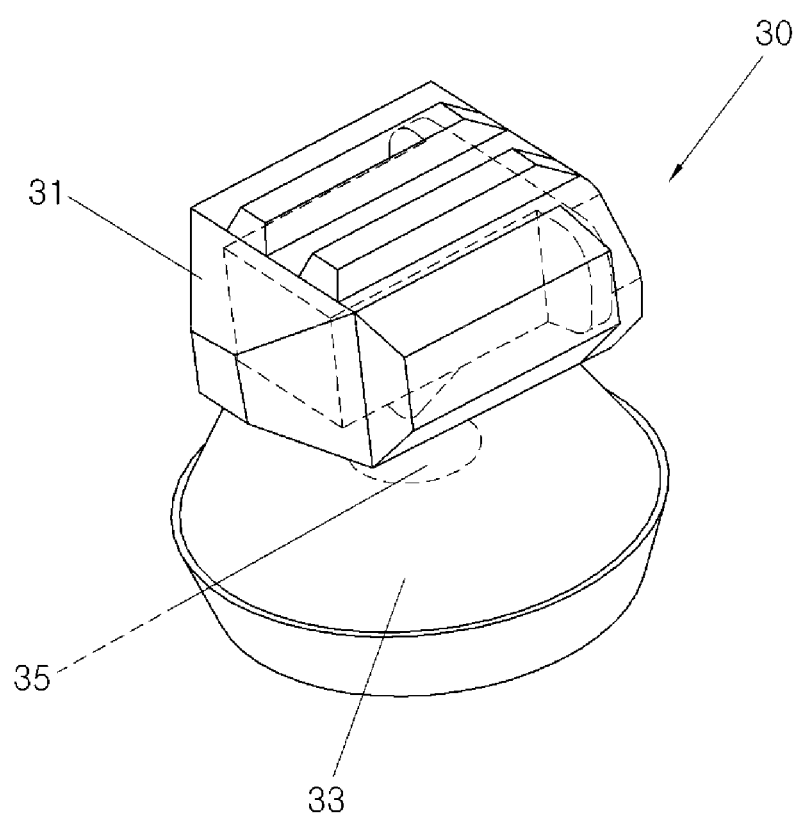

FIGS. 2A and 2B show configurations of the coreless support bracket 20 and the mounting bush 30 according to various embodiments of the present invention. As in FIG. 2A, the coreless support bracket 20 includes a mounting body 21 having a plurality of bolting holes through which the mounting body 21 is fastened to the engine 1 by bolts or other suitable means, a bridge body 23 that is integrally formed with the mounting body 21 in perpendicular or substantially in perpendicular to the mounting body 21, and a stopper flange 25 that changes a cross section of the bridge body 23 so as to divide a length of the bridge body 23 into two sections. One will appreciate that such integral components may be monolithically formed.

Especially, the bridge body 23 is further provided with a reinforcement boss 23-1. The reinforcement boss 23-1 protrudes downward from the bridge body 23 in a reverse triangular cross section. In some cases, the reinforcement boss 23-1 may be formed substantially in a conical shape.

The stopper flange 25 changes the cross section of the bridge body 23, for example, from a square shape to a rectangular shape. Thereby, the length of the bridge body 23 is distinguished between two sections in front and rear of the stopper flange 25. Typically, the stopper flange 25 is designed so that a thickness thereof is fit for the magnitude of durability required for the engine mount 3.

As in FIG. 2B, the mounting bush 30 includes a core body 31 having a predetermined shape, an insulator 33 having a substantially circular cross section with a center or axis substantially the same as that of the core body 31, and a reinforcement body 35 that intervenes between the core body 31 and the insulator 33 or connects the core body 31 with the insulator 33 so as to integrally form the core body 31 and the insulator 33. One will appreciate that such integral components may be monolithically formed.

The core body 31 is formed so as to have such a thickness as to exert a sufficient elastic force in a state in which it surrounds the bridge body 23 and the stopper flange 25 of the coreless support bracket 20. The insulator 33 is formed, for example, in a substantially truncated cone shape.

Figure 3:
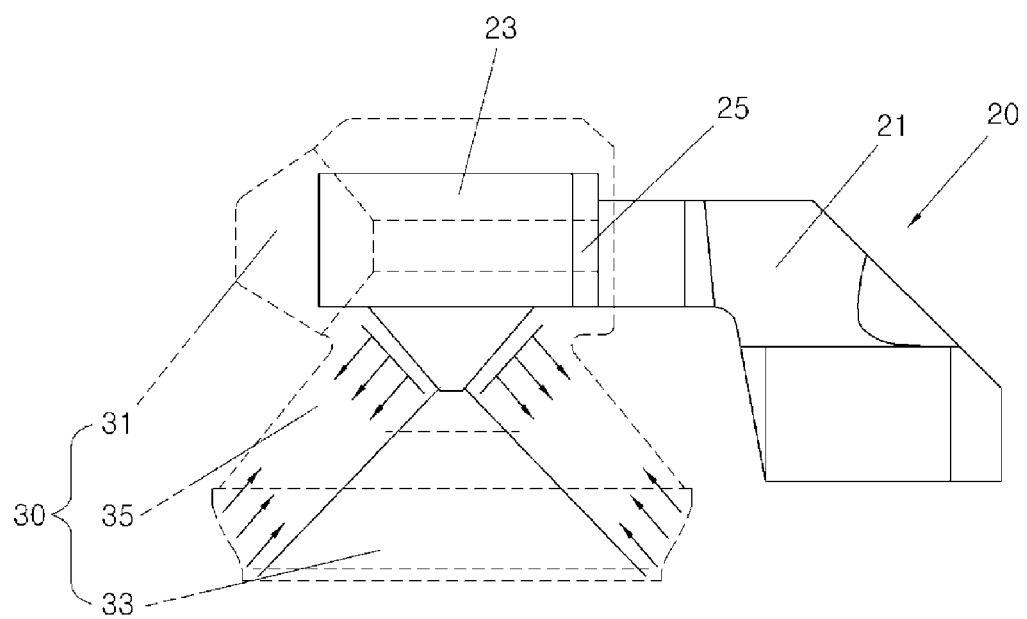
FIG. 3 shows a state in which the coreless support bracket and the mounting bush of FIGS. 2A and 2B are integrally formed.

FIG. 3 shows a configuration of a unity mounting-bush coreless-support-bracket according to various embodiments of the present invention. As shown, a unity mounting-bush coreless-support-bracket has an integral structure in which the mounting bush 30 is cured to the coreless support bracket 20.

In detail, the core body 31 of the mounting bush 30 surrounds the bridge body 23 of the coreless support bracket 20 up to the stopper flange 25 dividing the bridge body 23 into the two sections, and the reinforcement body 35 extending from the core body 31 completely surrounds the reinforcement boss 23-1 protruding from the bridge body 23. The reinforcement body 35 is integrally formed with the insulator 33. One will appreciate that such integral components may be monolithically formed.

Thus, the bridge body 23 of the coreless support bracket 20 acts as a core surrounded by the core body 31 of the mounting bush 30. Thereby, the durability required for the coreless support bracket 20 and the mounting bush 30 can be formed to sufficient magnitude. Particularly, a distribution function (indicated by arrows in FIG. 3) in which the reinforcement body 35 surrounding the reinforcement boss 23-1 distributes an applied external force is realized. Thereby, the durability required for the coreless support bracket 20 and the mounting bush 30 can be further reinforced.

Further, the stopper flange 25 provided to the bridge body 23 of the coreless support bracket 20 is also surrounded by the core body 31 of the mounting bush 30 so as to maintain a strong fixing force. Thereby, even when the engine 1 is pushed in the event of collision, it is possible to prevent a phenomenon in which the coreless support bracket 20 is separated from the mounting bush 30.

Figure 4:
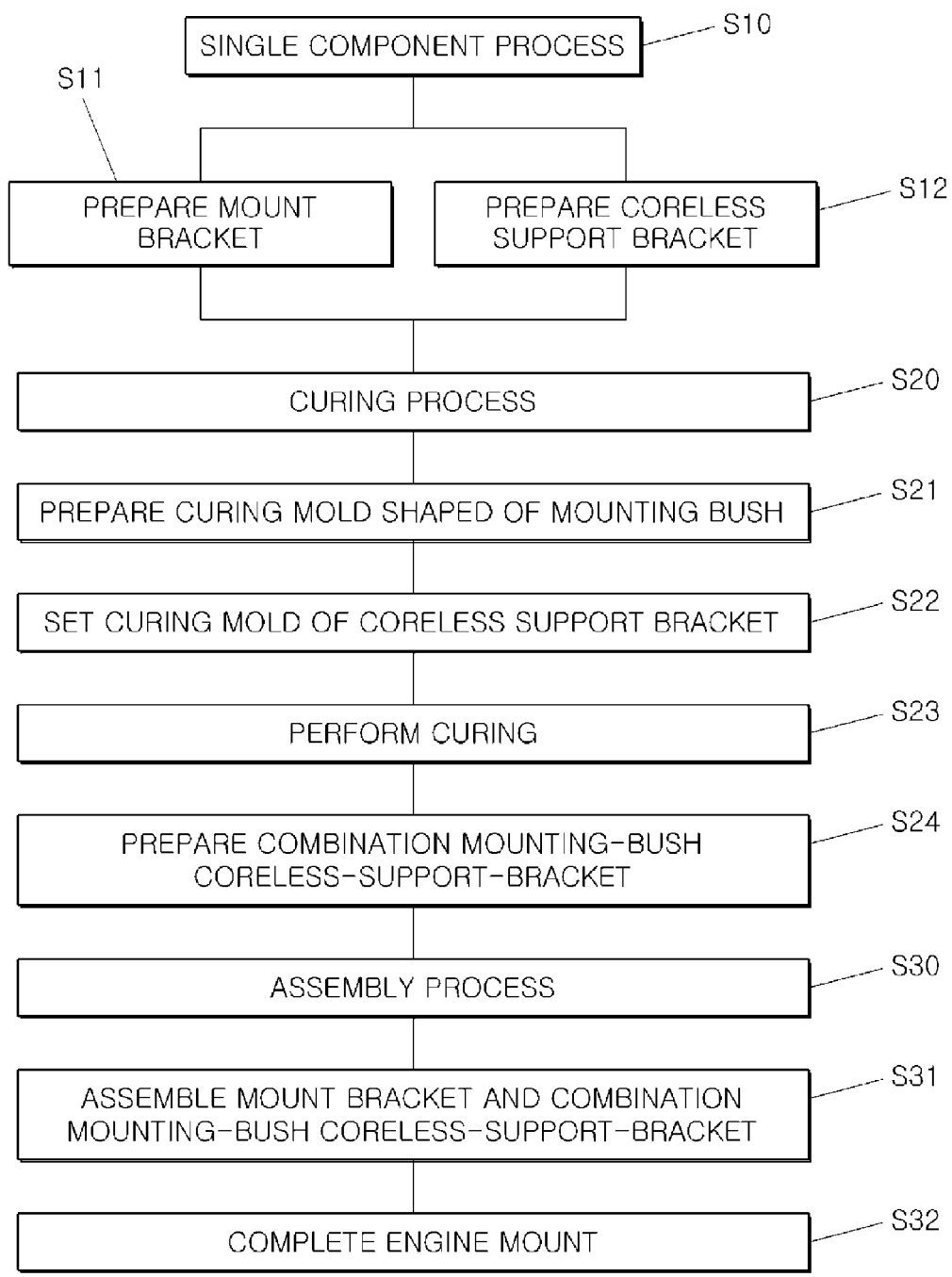
FIG. 4 shows an exemplary method of manufacturing a coreless engine mount according to the present invention.

FIG. 4 shows a method of manufacturing the coreless engine mount according to various embodiments of the present invention. Step S10 is a single component process and is divided into a process of manufacturing the mount bracket (S11) and a process of manufacturing the coreless support bracket (S12). The manufactured mount bracket and coreless support bracket are assembled into an engine mount.

Figure 5A:
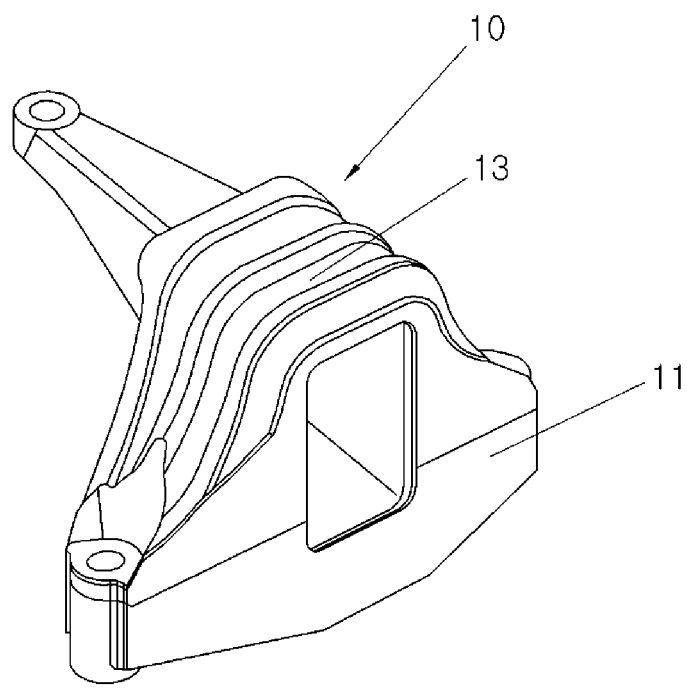
FIG. 5A and FIG. 5B show components of the coreless engine mount to which the manufacturing method of FIG. 4 is applied.
Figure 5B:
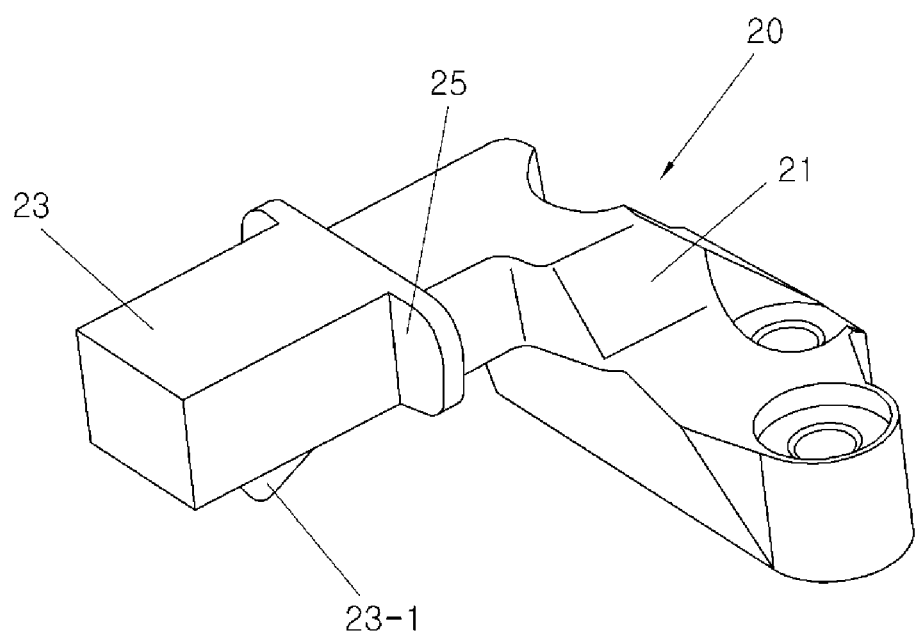

FIG. 5A shows an example of the mount bracket. In various embodiments, the mount bracket 10 includes the sub-bracket 11 and the main bracket 13. Further, FIG. 5B shows an example of the coreless support bracket. In various embodiments, the coreless support bracket 20 includes the mounting body 21, the bridge body 23 having the reinforcement boss 23-1, and the stopper flange 25 dividing the length of the bridge body 23 into the two sections.

Step S20 is a curing process. By using this process, the mounting bush is integrally cured to the coreless support bracket manufactured in step S12. Step S21 is a process of designing a curing mold. The curing mold having the shape of the mounting bush is manufactured in this process.

Figure 6:
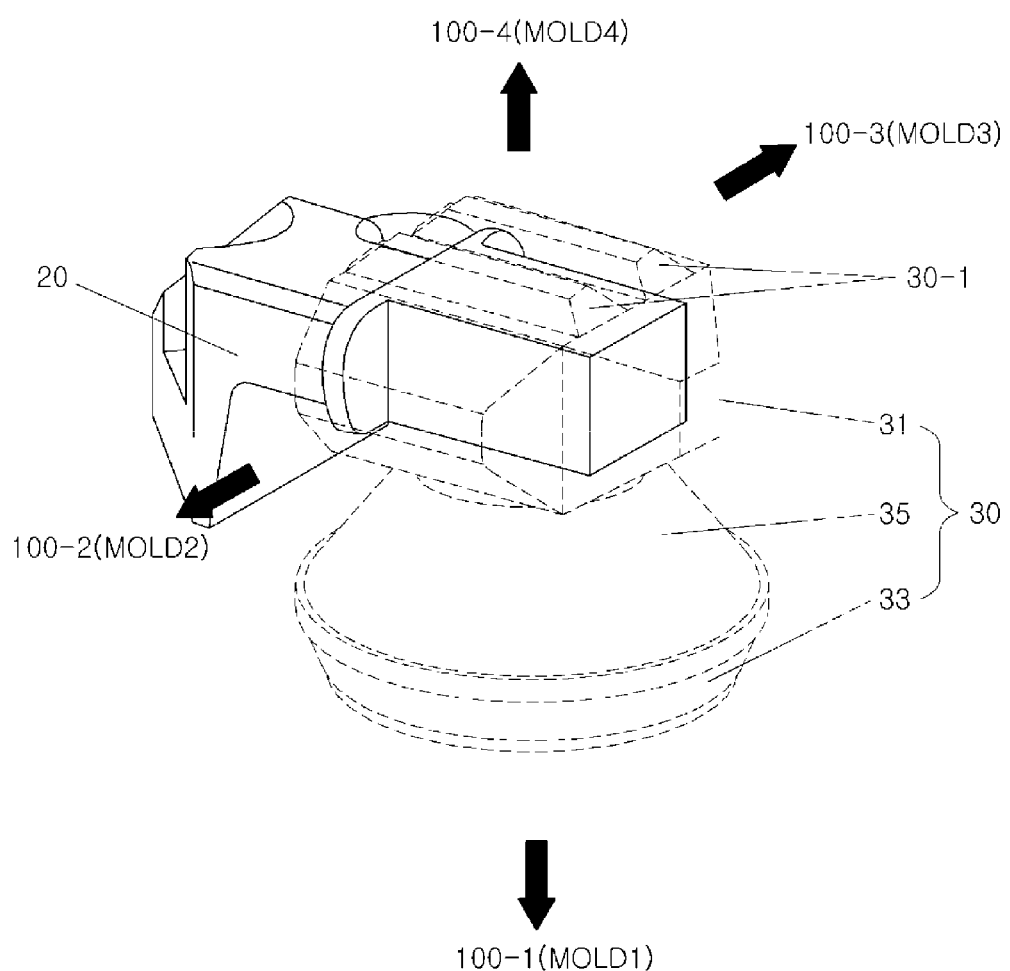
FIG. 6 shows an example of a curing mold for the manufacturing method of FIG. 4.

FIG. 6 shows an example of the design of the curing mold 100. In various embodiments, the mounting bush 30 includes the core body 31, the insulator 33, and the reinforcement body 35 intervening between the core body 31 and the insulator 33. The curing mold 100 is designed by a first mold part 100-1, a second mold part 100-2, a third mold part 100-3, and a fourth mold part 100-4 on the basis of the structure of the mounting bush 30.

However, the curing mold 100 may vary according to a structure for reinforcing a fasting force of the coreless support bracket 20 and the mounting bush 30. For example, the curing mold 100 may be designed by the first mold part 100-1, the second mold part 100-2, and the third mold part 100-3 according to the number of stopper protrusions 30-1 that reinforce the fasting force of the coreless support bracket 20 and the mounting bush 30 like the stopper flange 25.

Figure 7A:
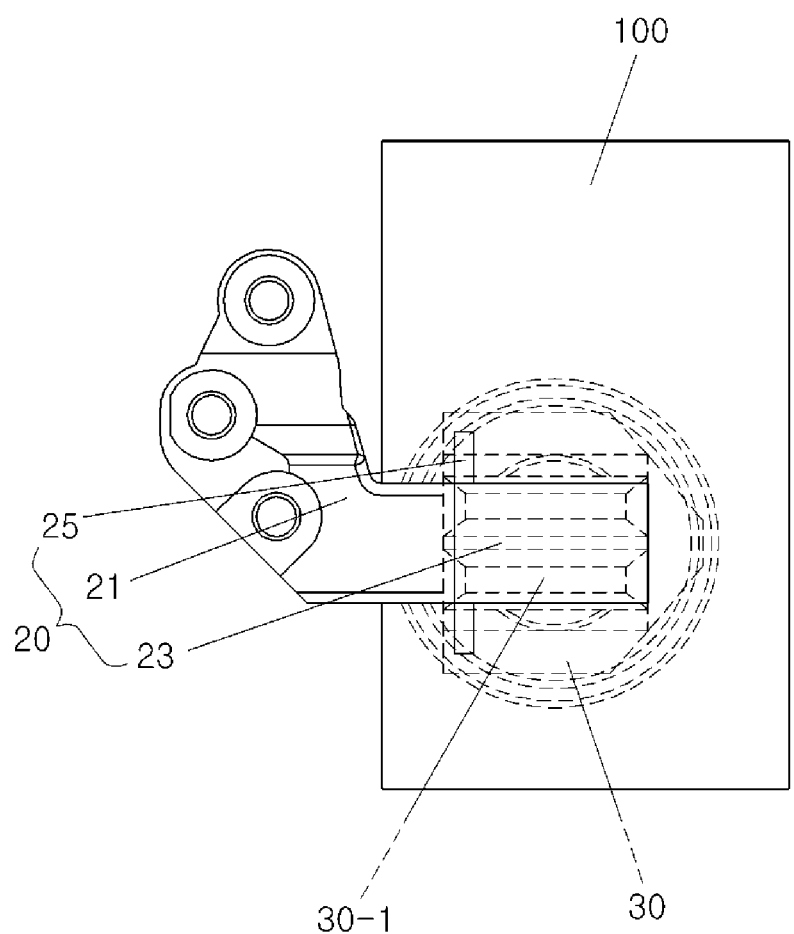
FIG. 7A and FIG. 7B show a state in which the curing mold in which the coreless support bracket is integrally formed with the mounting bush by the method of FIG. 4 is set.
Figure 7B:
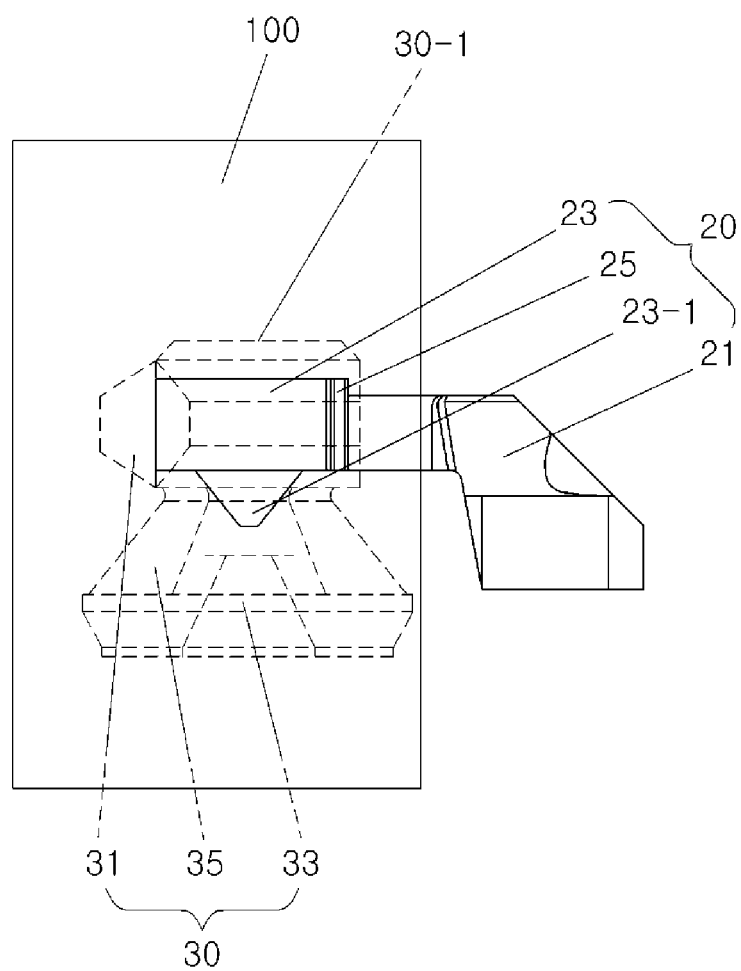

Step S22 is a process of setting the curing mold of the coreless support bracket. A position of the mounting bush cured to the coreless support bracket is set in this process. FIGS. 7A and 7B show an example of setting the curing mold and the coreless support bracket. The coreless support bracket 20 set to the curing mold 100 is located in a cavity having the shape of the mounting bush 30. Particularly, only a portion between an end of the bridge body 23 and the stopper flange 25 of the coreless support bracket 20 is located in the cavity. Thereby, a size of the curing mold 100 can be reduced.

Figure 8:
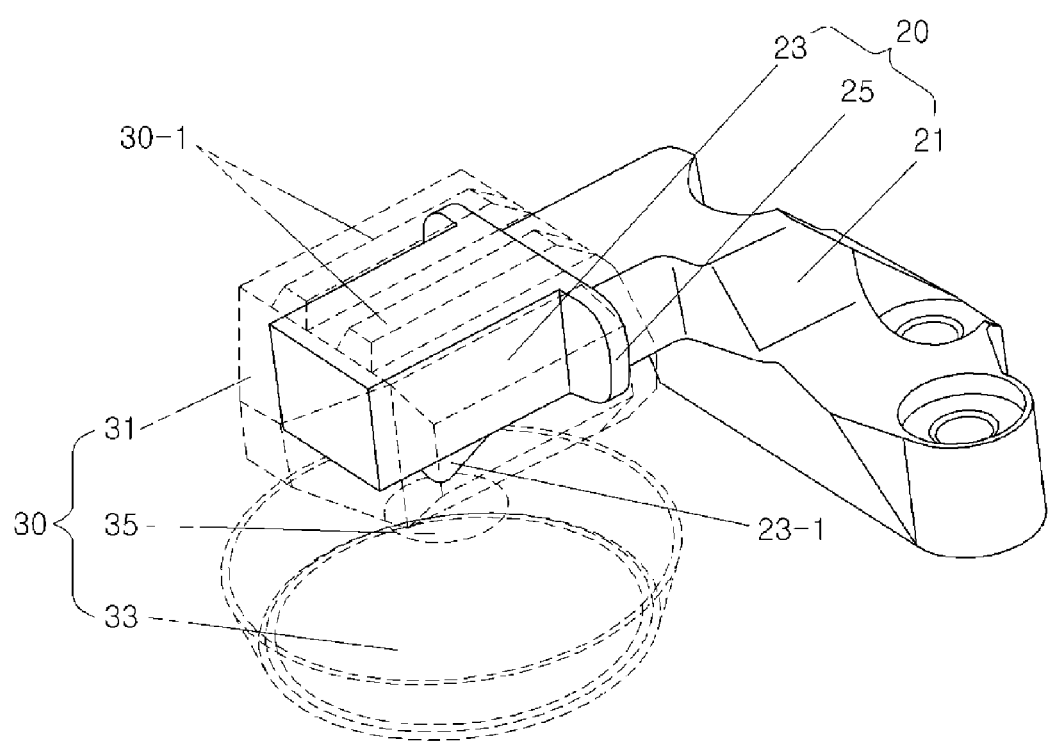
FIG. 8 shows an example of a unity mounting-bush coreless-support-bracket integrally manufactured by the method of FIG. 4.

Step S23 is a process of carrying out curing, and step S24 is a process of manufacturing a unity mounting-bush coreless-support-bracket. FIG. 8 shows an example of the unity mounting-bush coreless-support-bracket. In various embodiments, the core body 31 of the mounting bush 30 surrounds the bridge body 23 of the coreless support bracket 20 up to the stopper flange 25 dividing the bridge body 23 into the two sections, and the reinforcement body 35 extending from the core body 31 completely surrounds the reinforcement boss 23-1 protruding from the bridge body 23. The reinforcement body 35 is integrally formed with the insulator 33.

Thus, the unity mounting-bush coreless-support-bracket 20 can maintain the required durability to sufficient magnitude without a separate core fastened by bolts. Particularly, the durability can be further reinforced by a load distribution function based on the reinforcement body 35 surrounding the reinforcement boss 23-1. Further, the coreless support bracket 20 has the stopper flange 25 surrounded by the mounting bush 30. Thus, a possibility of separation caused by the pushing of the engine 1 in the event of collision can be greatly improved.

Step S30 is an assembly process. This process is a simple process of assembling the mount bracket and the unity mounting-bush coreless-support-bracket in step S31. Thereby, as in step S32, the engine mount can be completed. FIG. 9 shows an example of the assembled coreless engine mount. The insulator 33 of the mounting bush 30 is assembled to the sub-bracket 11 of the mount bracket 10 manufactured in step S11, and then the mounting bush 30 is covered with the main bracket 11 of the mount bracket 10. Thereby, the mount bracket 10 and the unity mounting-bush coreless-support-bracket 20 are assembled via the mounting bush 30.

As described above, the coreless engine mount 3 according to various embodiments includes the mount bracket 10 housing and fixing the mounting bush 30, and the coreless support bracket 20 that forms an extension integrally extending from the portion in which the mounting bush 30 is integrally formed by the curing and is formed of the aluminum material. Thereby, due to the weight reduction based on the aluminum material, the influence of the natural frequency is greatly reduced. Particularly, the mounting bush is directly cured to the support bracket. Thereby, the work process associated with bolting work is removed, and the durability required for the engine mount in the event of collision is satisfied.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coreless engine mount comprising:
   a mount bracket having at least one bolting hole for bolting, the mount bracket housing a mounting bushing; and
   a coreless support bracket having an extension integrally extending from the mounting bushing and formed of an aluminum material, the extension being integrally formed with the mounting bushing by curing, and the extension having at least one bolting hole for bolting,
   wherein the mounting bushing includes a core body integrally surrounding the coreless support bracket, and an insulator formed at an end of a reinforcement body integrally extending from the core body.

2. The coreless engine mount of claim 1, wherein the mount bracket includes a sub-bracket and a main bracket, and the sub-bracket and the main bracket overlap to form a housing space for housing the mounting bushing.

3. The coreless engine mount of claim 1, wherein the coreless support bracket further includes a portion that is not surrounded by the mounting bushing within the extension integrally formed with the mounting bushing, and the extension is bent at an end of the portion that is not surrounded by the mounting bushing.

4. The coreless engine mount of claim 3, wherein the extension integrally formed with the mounting bushing is divided by a stopper flange into a portion that is surrounded by the mounting bushing and the portion that is not surrounded by the mounting bushing, and the stopper flange is surrounded by the mounting bushing.

5. The coreless engine mount of claim 4, wherein the stopper flange has a larger cross section than the portion surrounded by the mounting bushing and the portion that is not surrounded by the mounting bushing.

6. The coreless engine mount of claim 3, wherein the extension integrally formed with the mounting bushing further includes a reinforcement boss, and the reinforcement boss protrudes in a substantially reverse triangular cross section.

7. A coreless engine mount comprising:
   a mount bracket having at least one bolting hole for bolting, the mount bracket housing a mounting bushing; and
   a coreless support bracket having an extension integrally extending from the mounting bushing and formed of an aluminum material, the extension being integrally formed with the mounting bushing by curing, and the extension having at least one bolting hole for bolting,
   wherein the coreless support bracket further includes a portion that is not surrounded by the mounting bushing within the extension integrally formed with the mounting bushing, and the extension is bent at an end of the portion that is not surrounded by the mounting bushing, and
   wherein the extension integrally formed with the mounting bushing further includes a reinforcement boss, and the reinforcement boss protrudes in a substantially reverse triangular cross section.

* * * * *